United States Patent Office 3,594,433
Patented July 20, 1971

---

3,594,433
CATALYTIC ISOMERIZATION PROCESS FOR THE PRODUCTION OF 5-ETHYLIDENEBICYCLO[2.2.1] HEPT-2-ENES
Wolfgang Schneider, Brecksville, Ohio, assignor to The B. F. Goodrich Company, New York, N.Y.
No Drawing. Filed Jan. 26, 1970, Ser. No. 5,987
Int. Cl. C07c 5/24
U.S. Cl. 260—666
9 Claims

ABSTRACT OF THE DISCLOSURE

5 - vinylbicyclo[2.2.1]hept-2-ene is isomerized to 5-ethylidenebicyclo[2.2.1]hept-2-ene when contacted with a catalyst comprising a titanium compound such as titanium alcoholates and cyclopentadienyl titanium halides with a Group I-A, II-A or III-A or Lanthanide metal or a Group I-A, II-A, III-A or Lanthanide metal in combination with certain Lewis acids. 5-ethylidenebicyclo-[2.2.1]hept-2-ene is a useful comonomer for polymerization with α-olefins such as ethylene and propylene.

BACKGROUND OF THE INVENTION

Catalytic processes for the isomerization of 5-vinylbicyclo[2.2.1]hept-2-ene to 5 - ethylidenebicyclo[2.2.1] hept-2-ene have not been completely satisfactory. High temperatures and large amounts of catalyst have been required to achieve acceptable isomerization rates. Polymeric residues and rearrangement by-products have also been obtained in most instances.

SUMMARY OF THE INVENTION

An effective catalytic process for the isomerization of 5 - vinylbicyclo[2.2.1]hept - 2 - ene to 5-ethylidenebicyclo-[2.2.1]hept - 2 - ene has been discovered. Isomerizations with the present process may be conducted at room temperature or below and still obtain acceptable isomerization rates. Polymeric and rearrangement by-products are minimized and in most instances completely eliminated with the process of the present invention. The catalyst system for the present process is comprised of a titanium compound selected from the group consisting of titanium alcoholates and cyclopentadienyl titanium halides with a metal of Group I-A, II-A, III-A or the Lanthanide Group or a metal of Group I-A, II-A, III-A or Lanthanide Group with a Lewis acid compound such as trihalides of a Group III-A metal. The isomerization may be represented as follows:

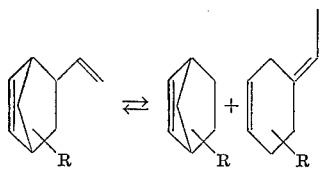

wherein R is a hydrogen or alkyl group containing from 1 to 4 carbon atoms. The present isomerization process is particularly useful to obtain 5 - ethylidenebicyclo-[2.2.1]hept-2-ene which is useful for copolymerization with olefins such as ethylene and proylene to form elastomeric materials.

DETAILED DESCRIPTION

5 - vinylbicyclo[2.2.1]hept-2-ene's employed in the present process and capable of being isomerized to 5-ethylidenebicyclo[2.2.1]hept-2-ene have the structural formula

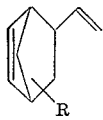

wherein R is a hydrogen or an alkyl group containing from 1 to 4 carbon atoms. The process is particularly useful for the isomerization of 5-vinylbicyclo[2.2.1]hept-2-ene, that is, where R is hydrogen, since this material is readily available by the Diels-Alder addition of 1,3-cyclopentadiene and 1,3-butadiene. Other 5 - vinylbicyclo-[2.2.1]hept-2-ene's such as methyl-5-vinylbicyclo[2.2.1] hept-2-ene obtained by the reaction of 1,3-cyclopentadiene with piperylene or methyl-1,3-cyclopentadiene with butadiene are also effectively isomerized by the present process.

The catalyst employed in the present process is comprised of a titanium compound with a Group I-A, II-A, III-A or Lanthanide metal or a Group I-A, II-A, III-A or Lanthanide Group metal in combination with a trihalide of a Group III-A metal. Titanium compounds employed are selected from the group consisting of titanium alcoholates having the formula $Ti(OR)_y(X)_{4-y}$ wherein X is chlorine, bromine or iodine and R is a hydrocarbon radical containing from 1 to 12 carbon atoms, and more preferably from 1 to 8 carbon atoms, such as alkyl, cycloalkyl, aryl, alkaryl and aralkyl groups and $y$ is an integer from 1 to 4; and cyclopentadienyl titanium halide compounds having the formula

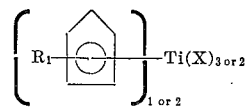

wherein X is chlorine, bromine, or iodine, $R_1$ is hydrogen or an alkyl group containing from 1 to 4 carbon atoms and wherein the titanium atom has no more than four available valencies satisfied. Accordingly, when a single cyclopentadienyl group is present three halogens will be bonded to the titanium and when two cyclopentadienyl groups are present two halogens will be bonded to the titanium. Cyclopentadienyl titanium halides have been described by G. Wilkinson et al. in J. Amer. Chem. Soc., 76, 4281 (1954). Illustrative of the titanium compounds are: cyclopentadienyl titanium trichloride, cyclopentadienyl titanium tribromide, dicyclopentadienyl titanium dichloride, dicyclopentadienyl titanium dibromide, tetraethyl titanate, tetra(isopropyl)titanate, tetra(n-butyl) titanate, tetra(2-ethylhexyl)titanate, tetraphenyl titanate, $(C_2H_5O)_3TiCl$, $(C_2H_5O)_2TiCl_2$, $C_2H_5OTiCl_3$ and the like.

Employed with the titanium compound is a Group I-A, II-A, III-A or Lanthanide metal, by itself, or in combination with a Lewis acid such as a trihalide of a Group III-A metal. Typical metals used with the titanium compound in the present process include lithium, rubidium, potassium, barium, strontium, calcium, sodium, magnesium, beryllium, aluminum, cerium and the like. Alloys or mixtures of two or more of the above-mentioned metals may also be used. The metals are conveniently used in a form in which they have a large surface area, for example, as chips or powder or dispersed in an inert hydrocarbon solvent. The latter method is particularly useful since it facilitates handling and storing the metals. The alkali metals lithium, sodium and potassium are especially useful with the present process. Trihalides of Group III-A metals which can be used with the Group I-A, II-A, III-A or Lanthanide metal and which have given excellent results are aluminum trichloride, aluminum tribromide and boron trifluoride. Other Lewis acid compounds may also be employed.

The catalyst for the present isomerization process is obtained by contacting the titanium compound with the metal or metal and Lewis acid combination. The catalyst may be prepared prior to use or the individual catalyst components may be mixed in the reactor in the presence of the 5-vinylbicyclo-[2.2.1]hept-2-ene to be isomerized. If the catalyst is prepared prior to the isomerization the catalyst components are generally mixed in an inert hydrocarbon solvent. This latter procedure facilitates storing and charging of the catalyst and is also advantageous as a means to control any reaction exotherm which might result.

While the ratio of the titanium compound to the metal or metal/Lewis acid may be varied over a wide range it is generally required that about 1 to 10 mol equivalents of the metal or metal/Lewis acid be employed per mol equivalent of the titanium compound. It is often advantageous to employ a molar excess of the metal or metal/Lewis acid to remove any impurities such as oxygen, alcohol, water and the like from the system. Excellent results have been observed when about 2 to 5 mol equivalents of the metal or metal/metal trihalide per mol equivalent of the titanium compound is employed. The molar ratio of metal to Lewis acid compound will be varied from about 10:1 to about 1:1.

While the concentration of the titanium compound is not critical it will generally range from about 100 millimols per mol 5-vinylbicyclo[2.2.1]hept-2-ene to about 0.1 millimol per mol 5-vinylbicyclo[2.2.1]hept-2-ene. Excellent results have been obtained when the concentration of the titanium compound ranges from about 1 to 50 millimols per mol 5-vinylbicyclo[2.2.1]hept-2-ene.

Isomerization is achieved by contacting the 5-vinylbicyclo[2.2.1]hept-2-ene with the catalyst at room temperature, or slightly below, or at elevated temperatures. The 5-vinylbicyclo[2.2.1]hept-2-ene is charged to the reactor and the preformed catalyst or the individual catalyst components added thereto. The preformed catalyst or each catalyst component may be charged completely at the outset of the isomerization or charged continuously or incrementally as the isomerization progresses. The isomerization process may be conducted employing either batch or continuous techniques. Prior to the introduction of the preformed catalyst or of the titanium compound, when the catalyst is to be prepared in situ, an amount of the metal or metal/Lewis acid may be charged to the reactor to remove any undesirable impurities which may be present in the system.

The isomerization is conducted at a temperature ranging from about 15° C. to about 200° C. or above. Excellent results have been obtained over the temperature range 25° C. to about 150° C. When continuous processes such as those employing tubular with short contact times temperatures greater than 200° C. may be advantageously employed. The process is typically carried out under a dry atmosphere of an inert gas such as nitrogen or argon. It may be conducted at atmospheric, subatmospheric or super-atmospheric pressure depending on the reaction conditions.

An inert diluent such as the aromatic or saturated aliphatic hydrocarbons may be used in conducting the present process. High-boiling hydrocarbons of this type are particularly useful since they do not interfere with the recovery of the 5-ethylidenebicyclo[2.2.1]hept-2-ene and since they also permit the operation of the process within the desired temperature range without the use of pressure vessels. Useful hydrocarbon solvents include pentane, isopentane, 2,2-dimethyl pentane, 2,4-dimethyl pentane, 3,3-dimethyl pentane, 3-ethyl pentane, n-hexane, isohexane, 3-methyl hexane, n-heptane, n-octane, isooctane, cyclohexane, benzene, toluene, xylene, mesitylene, and mixtures thereof. If a diluent is employed the ratio of the diluent to 5-vinylbicyclo[2.2.1]hept-2-ene will range between about 1:10 to about 10:1 on a volume basis.

The following examples illustrate the invention more fully.

EXAMPLE I

Twenty-five mls. 5-vinylbicyclo[2.2.1]hept-2-ene prepared by the Diels-Alder addition of 1,3-cyclopentadiene and 1,3-butadiene as described by A. F. Plate and N. A. Belikova in Zhurnal Obshchei Khimii, 30, No. 12, 3945–53 (1960) was charged to a reactor which had been previously purged with argon. One gram (4 millimols) dicyclopentadienyl titanium dichloride, 1 cc. (22 millimols) of a 50% sodium metal suspension in mineral oil and 0.2 gram (1.5 millimols) aluminum trichloride were then charged to the reactor. The reaction mixture was allowed to stand under an argon atmosphere at 30° C. with stirring for approximately one week after which time vapor phase chromatographic analysis showed 88.4% 5-ethylidenebicyclo[2.2.1]hept-2-ene to be present.

Employing similar reaction conditions, a mixture of 1- and 2-methyl-5-vinylbicyclo[2.2.1]hept-2-ene obtained by the Diels-Alder addition of methylcyclopentadiene and 1,2-butadiene was isomerized to the corresponding methyl-substituted 5-ethylidenebicyclo[2.2.1]hept-2-ene.

EXAMPLE II

Employing a similar procedure to that described in Example I, but using no Lewis acid with the dicyclopentadienyl titanium dichloride and metallic sodium, 5-vinylbicyclo[2.2.1]hept-2-ene was isomerized at an elevated temperature in an inert hydrocarbon diluent. The reaction mixture contained 12.5 grams 5-vinylbicyclo[2.2.1]hept-2-ene, 12.5 grams mesitylene, 0.5 gram (11 millimols) of a 50% sodium suspension in mineral oil and 0.5 gram (2 millimols) dicyclopentadienyl titanium dichloride. The reaction was conducted under an inert atmosphere at 150° C. Excellent conversions were obtained after only 90 minutes.

EXAMPLE III

A series of isomerizations were conducted in mesitylene with varying reaction conditions and different titanium compounds, both with and without Lewis acid. The reactions were conducted in 7 ounce glass reactors under an inert atmosphere. Each reactor was charged with 12.5 grams (0.1 mol) 5-vinylbicyclo[2.2.1]hept-2-ene, 12.5 grams mesitylene, 2 millimols of the titanium compound and 11 millimols of sodium metal (50% sodium dispersion in mineral oil). In runs employing a Lewis acid, 3.5 millimoles aluminum trichloride was added. The results of these runs and the reaction conditions are set forth in the table below.

| Titanium compound | Aluminum trichloride | Reaction Temp. (° C.) | Time (hours) | Percent conversion |
|---|---|---|---|---|
| Dicyclopentadienyl titanium dichloride. | + | 25 | 72 | 96 |
| Do | − | 25 | 72 | 74 |
| Tetrabutyl titanate | + | 100 | 72 | 91 |
| Tetra-2-ethylhexyl titanate. | + | 150 | 48 | 78 |

Similar results were obtained when aluminum tribromide or boron trifluoride were substituted for aluminum trichloride in the above runs and when tetraphenyl titanate and cyclopentadienyl titanium trichloride were substituted as the titanium compound.

EXAMPLE IV 5-ethylidenebicyclo[2.2.1]hept-2-ene was polymerized in solution with ethylene and propylene. To 500 mls. hexane maintained at −10° C. and saturated with a gas mixture (30 mol percent ethylene/70 mol percent propylene) was added 0.813 gram 5-ethylidenebicyclo[2.2.1]hept-2-ene and a reduced vanadium catalyst system (Al/V mol ratio=167). Throughout the polymerization the gas mixture (30/70) was continuously fed into the polymerizer with continuous agitation so that a concentration of about 30 mol percent ethylene was in the gas phase above the liquid. The polymerization was allowed to run for approximately 15 minutes. Approximately 4½ grams terpolymer was obtained upon precipitation with alcohol. The polymer contained about 33% by weight propylene and about 10% by weight 5-ethylidenebicyclo[2.2.1]hept-2-ene.

Compounded polymers of this type are useful in the manufacture of tire carcass. Compounded with about 80 parts black, 40 parts oil, 0.8 part TMTD, 0.4 part MBTS and 1.25 parts sulfur and cured at 320° F., tensiles of about 3000 p.s.i. with about 250% elongation are typically realized.

I claim:
1. A process for the isomerization of 5-vinylbicyclo-[2.2.1]hept-2-ene to 5-ethylidenebicyclo[2.2.1]hept-2-ene which comprises contacting a 5-vinylbicyclo[2.2.1]hept-2-ene of the formula

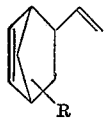

wherein R is hydrogen or an alkyl group containing from 1 to 4 carbon atoms with a catalyst consisting of (1) a titanium compound selected from the group consisting of titanium alcoholates of the formula

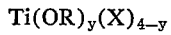

$$Ti(OR)_y(X)_{4-y}$$

wherein X is chlorine, bromine or iodine, R is a hydrocarbon radical containing from 1 to 8 carbon atoms and $y$ is an integer from 1 to 4 or a cyclopentadienyl titanium halide of the formula

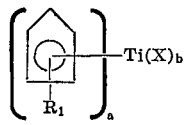

wherein X is chlorine bromine or iodine, $R_1$ is hydrogen or an alkyl group containing from 1 to 4 carbon atoms, $a$ is 1 or 2, $b$ is 2 or 3 and $a+b=4$; and (2) a Group I-A, II-A, III-A or Lanthanide metal or a Group I-A, II-A, III-A or Lanthanide metal with a Group III-A metal trihalide.

2. The process of claim 1 wherein the 5-vinylbicyclo-[2.2.1]hept-2-ene is 5-vinylbicyclo[2.2.1]hept-2-ene, the isomerization is conducted at a temperature between about 15° C. to 200° C. with a concentration of (1) from about 100 to 0.1 millimol per mol 5-vinylbicyclo[2.2.1]hept-2-ene and a molar ratio of (2):(1) from about 1:1 to about 10:1.

3. The process of claim 2 wherein the isomerization is conducted in an inert aromatic or saturated aliphatic hydrocarbon diluent.

4. The process of claim 2 wherein (2) is an alkali metal or an alkali metal with aluminum trichloride, aluminum tribromide or boron trifluoride and the molar ratio of (2):(1) is from 2:1 to 5:1 and the concentration of (1) is between 1 to 50 millimols per mol 5-vinylbicyclo-[2.2.1]hept-2-ene.

5. The process of claim 4 wherein (1) is dicyclopentadienyl titanium dichloride and (2) is sodium metal.

6. The process of claim 4 wherein (1) is dicyclopentadienyl titanium dichloride and (2) is sodium metal with aluminum trichloride.

7. The process of claim 4 wherein (1) is tetrabutyl titanate and (2) is sodium metal.

8. The process of claim 4 wherein (1) is tetrabutyl titanate and (2) is sodium metal with aluminum trichloride.

9. The process of claim 4 which is conducted in mesitylene.

References Cited
UNITED STATES PATENTS

| | | | |
|---|---|---|---|
| 3,009,001 | 11/1961 | Crain et al. | 260—666 |
| 3,151,173 | 9/1964 | Nyce | 260—666 |
| 3,347,944 | 10/1967 | Fritz | 260—666 |
| 3,472,824 | 10/1969 | Nakaguchi et al. | 260—80.78 |

DELBERT E. GANTZ, Primary Examiner

V. O'KEEFE, Assistant Examiner